July 25, 1967  W. A. BRASTAD  3,332,371
BREAD MAKING PROCESS
Filed Aug. 2, 1965  2 Sheets-Sheet 1
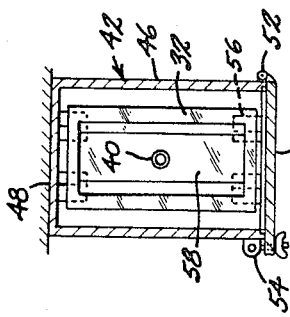
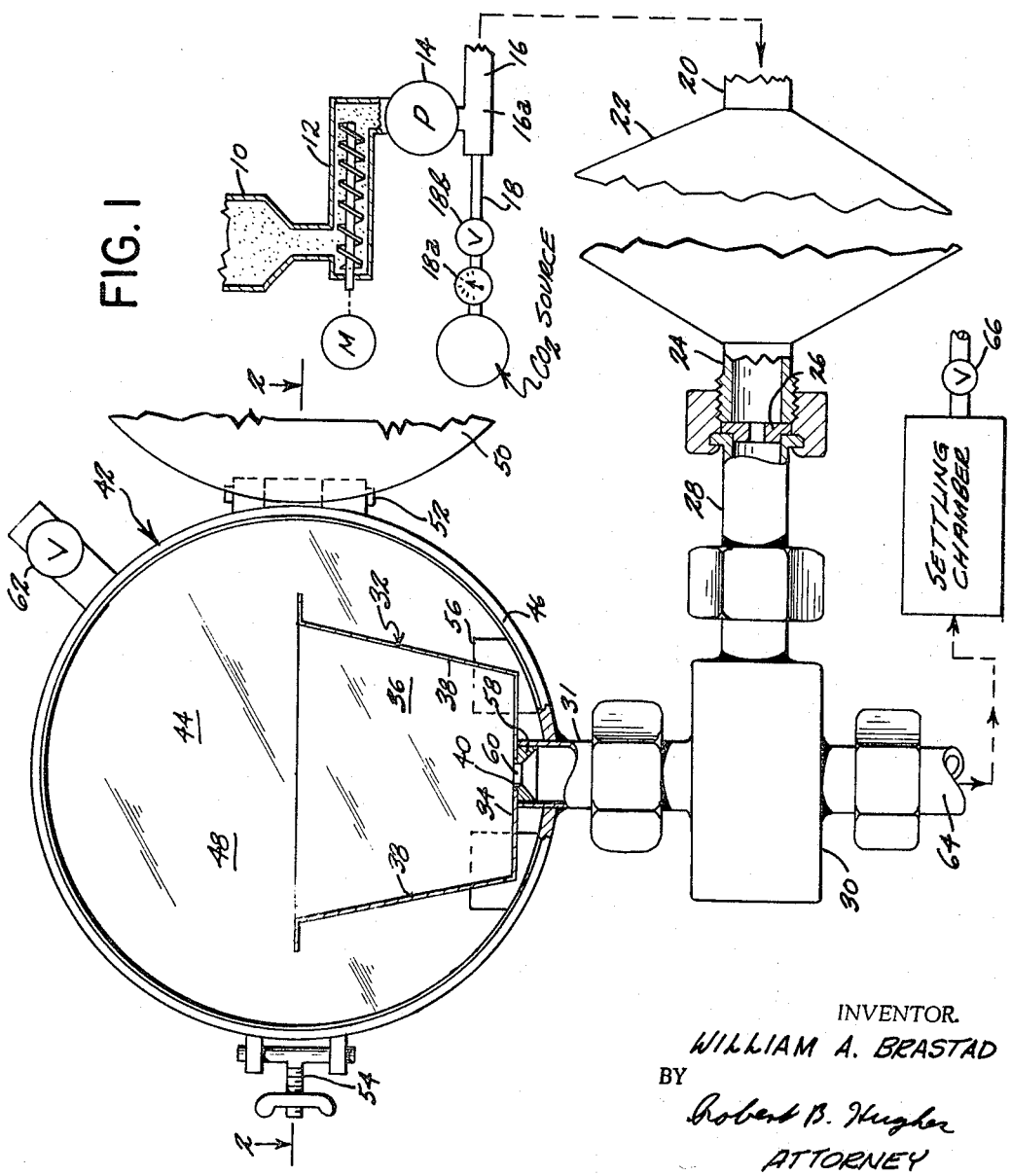
INVENTOR.
WILLIAM A. BRASTAD
BY
Robert B. Hughes
ATTORNEY

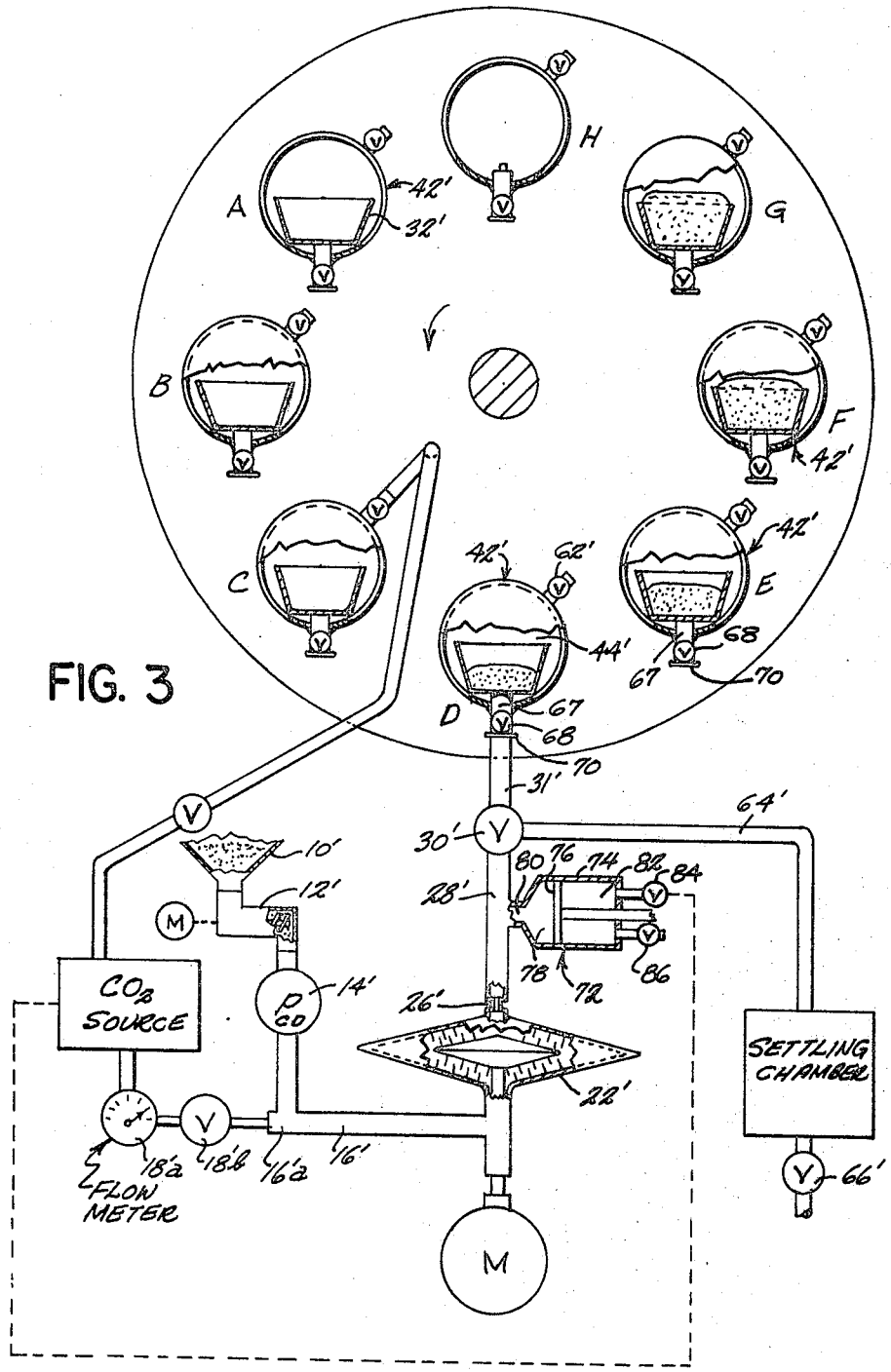

United States Patent Office 3,332,371
Patented July 25, 1967

3,332,371
BREAD MAKING PROCESS
William A. Brastad, Minneapolis, Minn., assignor to General Mills, Inc., a corporation of Delaware
Filed Aug. 2, 1965, Ser. No. 476,526
5 Claims. (Cl. 107—54)

This invention relates to a process for making bread, and more particularly to a process whereby undeveloped bread dough can quite rapidly be brought to a condition to be baked into a high quality bread product.

The present invention relates to a process for making bread, and more particularly to a process whereby developed dough can in a relatively short time be made into a high quality baked bread product.

Over the years a quite common method of making bread (called a "straight dough method") has been a batch process wherein the various ingredients (i.e., the flour, yeast, salt and water, with additions of fats or other related substances, sometimes also with yeast foods and malt) are mixed into a dough. This dough is then permitted to stand for about three hours, this being called the period of "bulk fermentation." During this period of bulk fermentation, many things take place within the dough. There is amylolytic breakdown of part of the starch to form fermentable sugars; carbon dioxide is produced by yeast fermentation causing the dough to expand; flavor forming components are produced; and there is hydration and other changes in the wheat proteins to make the dough strong and extensible. Part way through this period of bulk fermentation (after about the first two hours) the dough is usually "knocked down," this conveniently being accomplished by mechanically mixing the dough for about a minute to release part of the entrapped gas which has developed during the first two hours of bulk fermentation. The dough then is permitted to stand for the rest of the period of bulk fermentation (i.e. for about one hour).

After the period of bulk fermentation, the dough is divided into pieces or lumps, each of which corresponds in quantity to an ultimate loaf of bread; this usually is accomplished by means of an apparatus called a "divider." The divided pieces are then passed through a device called a "rounder" which shapes each piece to a more compact and ball-like configuration. Since the dividing and shaping of the dough compresses and distorts the dough so as to have a harmful effect on its cell structure, the rounded lumps of dough are permitted to stand for a period of about a quarter to a half hour, this period of processing being called an "intermediate proofing." During the intermediate proofing free gas is further generated or released from solution within the dough.

After the intermediate proofing, the dough lumps are each shaped into a loaf configuration and placed into baking pans preparatory to the "final proofing." As the dough lumps are shaped into their final loaf form for final proofing, the dough is worked to some extent to subdivide and distribute the gas in the dough. This final proofing of the dough is accomplished by permitting the shaped dough pieces to stand in the pans for a period of about forty-five minutes, during which time more free gas is released in the dough to increase substantially the volume of the dough. Then the dough is baked to form the finished loaves of bread. In the final baking step, there is usually a further expansion or enlargement of the dough to form the finished loaves of bread having the desired volume and cell structure.

There are, of course, other bread making methods, a common one of them being called the "sponge method." This method differs from the straight dough method in the initial steps of the process (i.e. the initial mixing and the bulk fermentation), while the latter steps (i.e. dividing the dough, the intermediate proofing, panning the dough, final proofing and baking) are performed in substantially the same manner as in the straight dough method.

Over a considerable number of years, various approaches have been taken to simplify and also to shorten the processes for making bread on a commercial scale, with varying degrees of success. Also attempts have been made to incorporate various ingredients to enhance the flavor, texture, color and other qualities of the final bread product, and in some cases certain ingredients have been used in conjunction with simplifications in the processing steps, usually in an attempt to compensate for the lack of certain compounds or changes that would be developed in the dough in the longer conventional bread making processes. Another avenue has been to incorporate in the dough air or other gases or to add substances which would generate gases in the dough, as a means of shortening or by-passing the raising of the dough by yeast fermentation. Also various changes in precessing conditions (e.g. time, temperature, pressure) have been tried to obtain various effects. And of course, quite an array of mechanical devices has come into being to aid in the bread making process.

Although for the most part, these various attempts have produced certain desired results, often they are offset by some disadvantage. For example, quite often some quality of the end product such as flavor, cell structure, color, etc., may be less than wholly desirable, or sometimes the expense is prohibitive. In some cases the matter of quality control becomes too difficult in that a satisfactory end product can be made under closely controlled laboratory conditions, but these conditions cannot be consistently duplicated when making bread on a commercial scale.

In contrast to this, a rather significant and commercially successful improvement in recent years has been that of "developing" the dough mechanically, rather than depending upon the bulk fermentation period to accomplish the same ends. In this process the first step is to prepare a "brew" by taking some of the dough ingredients, these usually being the water, sugar, salt, non-fat milk solids, yeast, yeast food and part of the flour, and mixing these into a slurry which is permitted to stand and ferment for about two and one-half hours. During this time certain components which enhance the quality of the end bread product are developed in the brew. This brew is then added to the rest of the flour, lard, emulsifier, possibly along with some other additives, and the total ingredients are mixed into a dough and then worked quite vigorously mechanically for about one or two minutes in a device appropriately called a "developer." This relatively brief period of mechanical developing produces generally the same physical effects as does the period of bulk fermentation, one of the more significant of which is believed to be a cross linking of the gluten molecules to produce a stronger and more extensible dough. The dough can then be taken from the developer, be placed directly into baking pans, be permitted to stand for a final proofing period of about forty-five minutes, and then be baked in an oven to form the finished bread product.

A comparison of the bread making process incorporating the mechanical development of the dough with one of the earlier conventional processes such as the straight dough method reveals that the total processing time of the former is appreciably shorter. The period of bulk fermentation (and in some methods also the intermediate proofing) is eliminated, since it is necessary only to mix the ingredients into a dough and develop the dough mechanically (the mixing and developing taking only a total of about three minutes) and then to give the bread a final proofing of about forty-five minutes before baking the bread, the baking taking about twenty to thirty minutes. Of course, preliminary to the mechanical developing of the dough, it is necessary to prepare a brew and let it stand for a two to three hour period, but this is a task simpler than the accomplishment of the bulk fermentation.

Yet to the best knowledge of the applicant there has been devised no process which effectively is able also to shorten or by-pass the final proofing and baking of the bread. Most prior art attempts which modify the conventional methods of final proofing have usually either resulted in an end product whose volume, cell structure, uniformity or some other quality is deficient in some regard, or the process has simply not proven to be practical for a commercial operation.

In view of this, it is a principal object of the present invention to provide an improved relatively rapid process for making bread of a high quality.

More particularly it is an object to provide such a process whereby an undeveloped bread dough can quickly and effectively be brought to a condition ready for baking, without the need of the conventional periods of bulk fermentation, intermediate proofing and final proofing.

It is a further object to provide such a process wherein it is possible to make a high volume type bread having a cell structure, uniformity and other characteristics quite similar to the type of bread most commonly made in present day commercial bakeries in the United States.

It is yet another object to provide such a process which readily lends itself to being practiced in a commercial operation.

These and other objects and features of the invention will be more readily understood and appreciated from the following detailed description of the preferred embodiments thereof selected for purposes of illustration and shown in the accompanying drawings, in which:

FIGURE 1 is a semi-schematic drawing of a simplified apparatus by which the present invention could be practiced;

FIG. 2 is a plan sectional view taken on line 2—2 of FIG. 1 but drawn to a smaller scale, and FIG. 3 is a schematic drawing indicating an arrangement by which the present invention could be practiced on a higher production basis.

Since it has long been known that the release of carbon dioxide during the fermentation of the bread dough causes the dough to raise, consideration has for many years past been given to the possibility of incorporating carbon dioxide, air, or some other gas into the dough to raise the dough as a means of speeding up the bread making process by eliminating the fermentation period and/or the proofing period normally required in bread making operations. Thus as early as about one hundred years ago (in U.S. patents to Fitzgerald, No. 33,432 and Re. 1,524), there was disclosed a method of incorporating in the bread dough carbon dioxide under pressure, and by releasing this pressure causing the dough to rise. Over the years and up to the present time, various other attempts with varying similarity to the Fitzgerald method have been made to accomplish generally the same result, but to the best knowledge of the applicant herein none of these has been used to any significant extent commercially.

Preliminary to the creation of the present invention, the applicant investigated some of these prior art approaches which seemed more promising. Although an exhaustive analysis of each was not made, the work that was done indicated that generally these prior art processes were not capable of making high volume loaves of bread comparable in overall quality to those which are now made by commercial bakeries, with the most perplexing area being centered around problems relating to the structure of the bread. Apparently the task of producing a bread loaf having high volume, and yet having a uniform cell structure of good appearance and a texture that is delicate when eaten and yet sufficiently firm to be practical, encounters a good many difficulties when it is attempted to bypass some of the slower steps used in conventional break making processes. It would appear that making a high volume loaf of uniform cell structure of good appearance and desirable texture is a task of some delicacy, which has, over a good many years, reached a stage of some refinement in conventional bread making processes.

However, it has been found that bread of high volume and overall good quality can be made quite rapidly by incorporating a suitable gas such as carbon dioxide into bread dough under pressure and causing the dough to rise by releasing this pressure, provided that this is done according to the process of the present invention disclosed hereinafter.

In general, this process entails injecting a predetermined amount of the gas (e.g. carbon dioxide) into an undeveloped bread dough under pressure, and feeding the dough through a dough developer. The dough emerges from this developer at a predetermined pressure and is immediately subjected to a moderate pressure reduction by passing the dough through a constriction. The dough is then fed (still confined under pressure) into a pressurized panning chamber, and this is best done by feeding the dough into this pressurized chamber in an upward direction in a manner that it will spread upwardly and laterally into a loaf configuration. After the desired amount of dough is placed in the chamber, the pressure therein is reduced at a predetermined rate to cause the dough to rise to a loaf configuration ready for baking (which corresponds to a loaf that has, according to a conventional bread making process, undergone final proofing). This dough loaf is then baked, and the resulting product is a loaf of bread of good overall quality.

With this somewhat general disclosure of the process in mind, it is believed the following more detailed description of the same can be accomplished with a greater degree of clarity by describing first the apparatus of FIGS. 1 and 2, then describing the actual mechanical steps by which this apparatus can be utilized to make bread according to the present invention, and then discussing the more significant aspects of the present invention in light of this background of the practical steps by which the invention can be practiced. After this, the apparatus of FIG. 3 will be discussed.

In the particular arrangement shown in FIGS. 1 and 2, undeveloped bread dough is placed in a hopper 10 from which it is moved by suitable means, such as an auger 12, to a constant displacement pump 14. This pump 14 moves the dough into a pipe 16 where a predetermined amount of gas (in the present embodiment, carbon dioxide) is injected into the bread dough. This is conveniently accomplished by injecting the carbon dioxide into the pipe 16 at the location of a right angle bend thereof at 16a. To accomplish this, there is a line 18 to direct the carbon dioxide under pressure from a suitable source thereof through a flow meter 18a and regulator valve 18b into the line 16 at 16a.

The line 16 then carries the dough with the carbon dioxide from the location of the right angle bend 16a into the infeed end 20 of a dough developer indicated schematically at 22. A machine suitable for use in the present invention is a mixer produced by E. T. Oakes Company of Islip, New York, Model 8M (this machine being the one used in the examples disclosed hereinafter). This machine (which can be termed "a developer") brings about the proper development of the dough (this being done by vigorously working the same mechanically for a short period) and discharges the dough from the outlet end 24 of the developer 22. In addition, this developer 22 incorporates the carbon dioxide into the dough in a manner which has not been fully ascertained. It is believed that this developer 22 causes some or most all of the carbon dioxide to become dissolved into the dough, and possibly distributes some of the carbon dioxide in finely divided bubbles throughout the dough.

The dough emerging from the developer 22 is immediately moved through a constriction 26 and into a pipe 28. The dough by virtue of moving through this constriction 26, experiences a pressure drop from the developer 22 to the pipe 28. The dough in the pipe 28 then passes through a three-way valve 30 (the purpose of which will be disclosed hereinafter) upwardly through a pipe section 31 into a pressurized panning chamber.

In forming a dough loaf, the dimensions of which are considerably larger than the cross section of the pipe 31, the dough is best injected in an upward direction into the panning chamber. With the assumption that it is desired to form the bread in a conventional loaf configuration, there is provided for each loaf a bread pan 32 having a floor or bottom wall 34, end walls 36 and side walls 38. As is customary in the prior art, this bread pan 32 has an overall shape corresponding to that desired for the end bread product. The bottom wall 34 has at the center thereof a hole 40 through which the dough is injected into the pan 32.

There is further provided an airtight container 42 which defines a panning chamber 44 in which the bread pan 32 is placed to receive a charge of dough. As shown herein, this container 42 comprises a horizontally aligned cylindrical wall 46, one end of which is closed by a wall 48, and the other end of which is provided with an airtight door 50 hinged thereto at 52 and held in its closed position by a locking clamp 54. The lower part of the cylindrical wall 46 is provided with locating blocks 56 defining a recess to receive the bottom portion of the pan 32 so that the pan 32 can be properly located in the chamber 44. So that the bread dough can properly be fed into the pan 32, the aforementioned pipe section 31 reaches upwardly through the bottom part of the cylindrical wall 46 to terminate at the location of the bottom hole 40 of the bread pan 32 properly located in the chamber 44, and this pipe section is provided with an end piece 58 having a discharge opening 60 which registers with the bottom opening 40 of the pan 32. The container 42 also has valve means, indicated at 62, by which gas can be fed into and released from the chamber 44, so that this chamber 44 can be pressurized and depressurized.

There is an other pipe 64 leading from the three-way valve 30 to a settling chamber (shown schematically in FIG. 1), which has a discharge valve 66 leading therefrom. The valve 30 is so arranged that it has a first position where the pipe 28 and 64 communicate with one another, and a second position where the pipe 28 communicates with the pipe 31.

In practicing the process of the present invention with the apparatus of FIGS. 1 and 2, the bread pan 32 is inserted in the proper location in the chamber 44 of the container 42, the door 50 is closed, and the chamber 44 is pressurized by injecting gas through the valve 62 (the valve 30 initially being in its first position in which pipes 28 and 64 communicate with one another). As indicated previously, the dough from the hopper 10 is fed by the auger 12 to the pump 14. When the auger 12 has actually moved dough into the pump 14 so that no gas can escape rearwardly therethrough, the valve 18b is opened long enough to pressurize the system (i.e., the developer 22, the settling chamber and the connecting pipes) to about the same pressure level as the panning chamber 44, and the dough is then fed from the pump 14 into the developer 22. As the dough begins to move past the location 16a and into the developer 22, the valve 18b is manipulated as required to insure the proper flow of carbon dioxide into the dough. The first portion of dough emitted from the developer 22 passes into the settling chamber, and after this the valve 30 is immediately turned to its second position to direct the flow of dough from the developer 22 upwardly through the pipe 31 into the pan 32 in the pressure chamber 44. As the dough moves upwardly through the hole 40 into the pan 32, the dough spreads outwardly over the bottom 34 of the pan 32 in the desired loaf-like configuration.

When the proper amount of dough is in the pan 32, the valve 30 is turned back to its first position, and the gas in the chamber 44 is permitted to escape therefrom through the valve 62. This pressure drop in the chamber can proceed with relative rapidity (in a time even as short as about 10 seconds), but should not take place abruptly since any such sharp change in pressure will damage the cell structure of the dough loaf in the pan 32. When the pressure in the chamber 44 has reached the level of the surrounding atmosphere, the door 50 is opened and the pan 32 with the bread dough therein in a raised condition ready for baking, is removed from the chamber 44 and placed in a baking oven. A second pan 32 can then be placed in the chamber 44, and another dough loaf ready for baking can be made in the same manner as described immediately above.

In general, it may be said that the configuration of the dough when first injected into the chamber 44 will correspond roughly to that of a dough portion which in a conventional bread making process is ready to begin its final proofing. After the pressure in the chamber 44 is reduced to cause the dough to raise, the configuration of the dough corresponds generally to a dough loaf which in a conventional bread making process has gone through its final proofing and is ready for baking.

Various aspects of the present invention will now be considered in light of the foregoing description. Where specific operating conditions (for example, with respect to pressures, flow rates, etc.) are discussed, these will be considered in relation to the specific apparatus shown in FIGS. 1 and 2 and the specific steps disclosed, with the understanding that modifications of the same will require appropriate adjustments in such processing conditions.

First, with regard to the bread dough used in the present invention, it may be stated generally that most of the common bread dough formulations now used in commercial baking operations would be suitable for use in the present invention. The precise formualation to be used will depend, of course, upon the character of the bread desired as an end product. A typical dough formula would include as ingredients flour, water, sugar, salt, milk solids, yeast food, yeast, lard, emulsifiers, oxidizing agents, and perhaps some other additives, one such formula being disclosed in the first example herein. The bread dough is best prepared by first preparing a "brew," as in the manner described in the introductory portion of this disclosure of the present invention. As indicated previously, a brew is usually prepared by taking some of the dough ingredients, these usually being the water, sugar, salt, non-fat milk solids, yeast, yeast foods and part of the flour, and mixing these into a slurry which is permitted to stand and ferment for about two and one-half hours. During this time certain flavor components which enhance the quality of the end bread product are developed in the brew. This brew is then added to the rest of the flour, lard, emulsifier, possibly along with some other additives, and the total ingredients are then mixed in a conventional manner to form a dough. As indicated previously, this is an "undeveloped" dough.

With regard to the gas which is incorporated with the bread dough in the present invention, as previously indicated, carbon dioxide is a suitable gas, and in various respects is generally quite desirable for use in the present invention (e.g., with regard to expense, availability, etc.). However, other gases which are readily soluble in bread dough could also be used, provided that the same are not toxic or objectionable in some other regard (e.g., perhaps in degrading the taste, color, or some other quality of the end product). Nitrous oxide has been found to be quite satisfactory in the present invention; but air, probably because of its not being readily soluble in bread dough, does not produce as good a result as either carbon dioxide or nitrous oxide. In general, it may be said that the gases which would give the most successful results have solubilities of the order of 4 to 6 volumes of gas in each volume of water at the developer pressures used.

Another consideration is the amount of carbon dioxide (or other gas) per unit of dough that is to be incorporated in the dough. This is in turn related to the pressures to which the dough and/or gas is subjected at various stages of the process, and so the two topics will be discussed together. First, as a practical matter, it is desirable to carry out this process in an ambient atmosphere of normal atmospheric pressure (which at sea level is about 14.7 p.s.i.) and in a manner that when the panning chamber is depressurized to the extent that the dough therein is raised to the desired configuration ready for baking, the pressure within the panning chamber has been reduced to the pressure of the ambient atmosphere. Thus the pressures which are discussed hereinafter will be based on the assumption that the end raised bread dough product ready for baking will be in its desired configuration when the pressure in the panning chamber has been reduced to atmospheric. Also the pressure conditions disclosed hereinafter will be on the assumption that carbon dioxide is used, since it is understood that these pressure relationships depend somewhat on the character of the gas used. Other factors, such as the character desired for the end product, the precise type of dough used, etc., may affect the optimum pressure relationships to be employed. However, those skilled in the art will shortly be able to determine the optimum pressure conditions for the particular manner in which they are practicing the process, by making a few runs and observing the results at various pressure levels. Thus, it is understood that the pressure levels recited herein are not absolute quantities, but can be varied within reasonable limits.

The pressure at which the pump 14 delivers dough through the pipes 16 to the developer 22 and the pressure at which carbon dioxide is delivered through the pipe 18 into the dough pipe 16 and into the developer 22 determine to a large extent the amount of carbon dioxide which can properly be incorporated into the dough. On the assumption that it is desired to have a high volume loaf (such as that which is now commonly sold in the United States, such a loaf having a weight after baking of about 460 gms. per 2800 cubic centimeters), carbon dioxide is delivered into the pipes 16 at sufficient pressure and the pump 14 is operated in a manner that the dough pressure in the developer 22 in about 180 p.s.i., and so that about 1700 ccs. of carbon dioxide (as determined according to the method disclosed in Example I herein) can be incorporated in 550 gms. (weight before baking) of ordinary bread dough (such as that disclosed in Example I herein).

As indicated previously, the dough emerging from the developer 22 is immediately passed through an orifice 26 and into the pipe 28. In passing through the orifice 26, the dough experiences a drop in pressure (the pressure of the dough in the developer being about 180 p.s.i. and the pressure in the dough in the pipe 28 immediately after the orifice being about 130 p.s.i.). Although it has been found that moving the dough through the pipe 28 by first passing it through the orifice 26 has the effect of improving the cell structure of the end product, the reason or reasons for this phenomenon are not completely understood. Perhaps it is that this moderate pressure reduction releases part of the carbon dioxide that is dissolved in the bread dough so as to form in the dough very many minute bubbles, which become the nuclei of the many somewhat larger gas cells which develop in the raising and baking of the dough. Another possibility is that the constriction 26 by centering the dough as it emerges into the pipe 28 (the constriction 26 being centered with respect to the pipe 28), thus relieves some of the shear stresses which the inside wall of the pipe 28 would otherwise inflict more severely on the dough passing therethrough.

With regard to this latter consideration of inflicting shear stresses on the dough, it has been found that if the dough from the developer 22 is caused to travel through too great a length of pipe before being discharged into the pressurized panning chamber, there is a detrimental effect on the cell structure of the dough (presumably from the greater effect of the shear stresses caused by the greater length of pipe). Also, if the dough in passing from the developer to the panning chamber is caused to go through an unduly circuitous route (i.e., one with several sharp bends), there is a similar detrimental effect on the structure of the dough. However, the particular pipe and valve arrangement shown in FIG. 1, by which the dough is moved from the developer 22 to the panning chamber 44 has been found to be quite satisfactory to produce a high quality end product. In this arrangement, the orifice 26 is located in the exit end of the developer 22; the length from the orifice 26 to the center of the valve 30 is 5 inches; and the length from the center of the valve 30 to the discharge opening 60 is 3 inches. The pipe 28 and the pipe 31 have a nominal one inch diameter, with the actual inside diameter being 0.9 inch. The diameter of the orifice 26 is .25 inch and the diameter of the exit opening 60 is $^{29}/_{32}$ inch. The valve 30 has a minimum passage diameter of about 0.9 inch in diameter and is a 3-way valve, Model No. 11CPLO, produced by Ladish Company. Thus, in this arrangement, the dough from the developer 22 to the panning chamber 44 travels a total distance of about 8 inches, and makes one right-angle turn through the valve 30.

Some experimentation was done in modifying the path by which the dough is fed from the developer 22 to the panning chamber 44, by varying the length and number of bends in such path. It was found that when a somewhat detrimental effect was encountered by placing a right-angle bend in the pipe, this effect was alleviated to some degree by placing a constriction, similar to that at 26, in the flow path immediately after that bend. As in the case with the orifice 26 immediately after the developer 22, this phenomenon is not completely understood, but again it can be theorized that it has to do with the manner in which the carbon dioxide becomes dissolved and is released in the dough and/or perhaps alleviating the shear stresses to which the dough is subjected.

Since a certain amount of dough must pass through the developer 22 before the apparatus reaches a condition of equilibrium in which loaves of a predictable quality can be produced, it is desirable that the first portion of dough be diverted by the valve 30 through pipe 64 into the settling chamber which has a discharge valve 66, which has previously been pressurized to about the same level as the panning chamber 44. After a portion of the dough (e.g., about 300 grams) has passed into the settling chamber, the valve 30 is turned to direct the flow of dough into the panning chamber 44, and this dough has a character such that a satisfactory end product is produced.

To produce the high volume type bread discussed previously, the pressure in the panning chamber 44 should be maintained at about 100 p.s.i. (on the assumption that carbon dioxide is being used) while the dough is being discharged into the bread pan 32 in the chamber 44. Desirably, the gas which is used to pressurize the panning chamber 44 is the same as that which is incorporated into the bread dough as it is fed into the developer 22. (Thus, in the embodiment disclosed herein where carbon dioxide is incorporated into the bread dough, carbon dioxide would also be used to pressurize the panning chamber 44.) The reason for this is believed to be that if a gas different from that incorporated in the dough is used in the panning chamber 44, there will be, with respect to each gas, a partial pressure differential between the gas portion in the dough and that outside the dough, and there will be a tendency for the gas in the dough to escape out into the chamber 44 and the gas in the chamber 44 to move into the dough. Apparently this will occur even though the overall pressure within the dough and outside the dough is in equilibrium. The effect is detrimental to the cell structure of the dough, especially the cell structure near the surface of the dough.

Since one of the advantages of the present invention is considered to be that it does lend itself to being practiced as part of a commercial operation, it is believed a better appreciation of the present invention will be attained if there is described at least generally an arrangement by which bread can be made according to the present invention at a rate of output that would be expected for a commercial operation. Such an arrangement is indicated schematically in FIG. 3, and the components thereof which correspond generally to components of the apparatus of FIGS. 1 and 2 will be given like numerical designations, with a prime (') designation distinguishing those of the apparatus of FIG. 3.

Thus there is shown in FIG. 3 a hopper 10' in which bread dough is placed and fed by an auger 12' to a constant displacement pump 14'. This pump 14' moves the dough into a pipe 16', wherein carbon dioxide is injected at 16'a. The dough and carbon dioxide moves through the developer 22', through the constriction 26', thence through the pipe 28' to the 3-way valve 30'. One pipe 64' leads from the valve 30' to a settling chamber, which has a discharge valve 66', while another pipe 31' feeds the dough to its panning chamber. This particular valve 30' has a first position where the pipe 28' communicates with the pipe 64', a second position where the pipe 28' communicates with the pipe 31', and a third closed position where the flow out the pipe 28' is blocked.

In the apparatus of FIG. 3, there is provided a plurality of containers 42', each of which is generally similar to the container 42 in FIGS. 1 and 2, and each of which is adapted to hold a respective bread pan 32' in much the same manner as the container 42 holds its bread pan 32. Each container 42' has a valve 62' and also has a short length of pipe 67 which extends upwardly a short distance into the pressurized chamber 44' to terminate at the location of the bottom hole 40' of a respective bread pan 32' which is placed in its proper location in its respective container 42'. This pipe length 67 is provided with a valve 68 and has at its lower end a quick disconnect coupling, indicated schematically at 70, by which it can be quickly connected to and disconnected from the aforementioned pipe 31'.

These containers 42' are arranged in a general "Ferris wheel" pattern. That is to say, the containers 42' are disposed at evenly spaced intervals in a circular pattern about a horizontal center axis of rotation. Suitable drive means (not shown) are provided to move the containers 42' intermittently in increments of travel equal to the spacing of the containers 42', so that these containers 42' move in sequence through a cyclic revolution to a plurality of stations to accomplish the process of the present invention.

These stations are designated by the letters A–H, respectively, and the operating sequence occurs as follows:

At station A, an empty bread pan 32' is inserted into the container 42';

At station B, the container 42' is closed;

At station C, a suitable gas (such as carbon dioxide) is inserted into the container 42' through the valve 62' to bring the pressure in the chamber 44' up to the desired level;

At station D, the pipe 31' is connected to the coupling 70; the valves 68 and 30' are opened until a desired amount of dough is fed through the inlet pipe 67 into the pan 32'; the valves 68 and 30' are closed; and the coupling 70 is disconnected.

At station E, a portion of the carbon dioxide in the chamber 44' is released through the valve 62' to reduce the pressure therein to some degree (e.g., to about half the pressure in the chamber 44' at station D);

At station F the pressure in the chamber 44' is further reduced to the level of the surrounding atmosphere;

At station G the container 42' is opened, and

At station H the pan 32' with the raised dough therein is removed from the chamber 44', after which it can immediately be placed in a baking oven.

It is understood that in a commercial operation, many, if not all, of the operations indicated above would be performed mechanically. However, it is not necessary for an understanding of the general character of this arrangement to show the various mechanical devices and control apparatus which could be used to accomplish the same, and accordingly no attempt will be made to do so.

Since in the operation of the apparatus of FIG. 3, it would be desirable to continue feeding dough through the developer 22' even while the containers 42' are moving from station to station and the valve 30' is closed, there is provided a surge chamber device, generally designated 72. This device 72 comprises a cylinder 74, in which there is mounted a piston member 76 arranged for reciprocating slide motion therein. This piston member 76 divides the cylinder 74 into a head chamber 78 which communicates with the pipe 28' through a passageway 80, and into a rear chamber 82. This chamber 82 has a gas inlet valve 84 through which the chamber 82 can be pressurized from the carbon dioxide source of the apparatus, and there is also provided a discharge valve 86 to relieve pressure in the chamber 82.

When the containers 42' are moving from one station to the other, at which time the valve 30' is closed so as to stop flow to the pipe 28', the dough from the developer 22' will be diverted through the passage 80 into the head chamber 78 (which can be termed a "surge chamber"). As dough continues to move into the chamber 78 and force the piston 76 back, the pressure in the back chamber 82 will increase somewhat. As soon as a second container 42' is connected to the pipe 31' and the valve 30 is opened, the piston member 76 forces some of the dough in the surge chamber 78 back into the pipe 28'. Thus, operation of the developer 22' is not delayed while the containers 42' are changing stations. As in the first disclosed embodiment, there is provided a settling chamber, which as in the previous embodiment, can be used when the apparatus is first beginning to move dough through the developer 22'.

It is to be understood that the apparatus of FIG. 3 is shown very schematically merely to illustrate generally the manner in which the process of the present invention might be carried out in a higher production basis, and is not meant to show the specific construction of the same. For example, the surge chamber device 72 is intended merely as a schematic illustration and is not intended to show the actual physical arrangement of such a device. Of course, if actual apparatus were to be set up generally according to the arrangement of FIG. 3, due regard must be given to the various considerations recited previously (e.g., those considerations relating to moving the dough from the developer, etc.).

The invention will be disclosed with more particularity in the following examples. In each of these examples the apparatus shown in FIGS. 1 and 2 and described in detail previously herein was used and will be referred to specifically in these examples.

*Example 1*

A bread dough was prepared in a conventional manner as follows. First, a brew was prepared by adding to 3000 gms. of water the following ingredients:

1500 gms. of a medium strength baker's flour made from hard red winter wheat, 250 gms. of sucrose,
115 gms. of salt (sodium chloride),
12.5 gms. of Fleischmann's Buffer,
162½ gms. of yeast,
50 gms. non-fat milk solids These ingredients were stirred into the water, and the resulting mixture was left to stand at about 80° F. for about 2½ hours. Throughout this 2½ hour period this mixture was gently stirred. At the end of this 2½ hour period, this brew was poured into the mixing bowl of a Hobart Mixer, and to this brew was added the following ingredients:

3500 gms. of flour (same as specified above),
150 gms. of Swift Sanco shortening
12.5 gms. emulsifier (The shortening and emulsifier had been melted and blended and were then added to the rest of the ingredients.) Also, at this time a certain amount of additional water was added to bring the resulting dough to the desired moisture level. (This moisture level is defined in terms of "water absorption," which is the total percentage of water added in comparison with the total amount of flour used.) In the present example, 150 gms. of water was added to bring the total amount of water used to 3,150 grams so that the water absorption of the resulting dough was 63%. The Hobart Mixer was then operated at slow speed for about 1 minute, and then operated at high speed for about 2 minutes to form a bread dough.

This bread dough was then placed in the hopper 10 and fed by the auger 12 into the constant displacement pump 14. The carbon dioxide source was a cylinder containing carbon dioxide at about 850 p.s.i. pressure. As soon as the bread dough had entered into the pump 14 so that there would be no leakage rearwardly therethrough, the pump 14 and auger 12 were stopped, and the valve 18b was opened until the carbon dioxide flowing into the pipe 16, the developer 22, the pipes 28 and 64, and into the settling chamber brought the pressure in these components to a level of about 100 p.s.i. (gauge pressure). A conventional bread pan 32 (used to make one pound loaves of bread), was placed in the chamber 44, which was then pressurized with carbon dioxide (from the same carbon dioxide source) to about 100 p.s.i., gauge pressure. After these components were pressurized, the auger 12 and pump 14 were again started up to feed dough into the pipe 16 and to the developer 22. Also, the developer 22 was started up, and as dough began to flow into the pipe 16, the valve 18b was opened to the extent that carbon dioxide flowed into the pipe 16 at the desired rate. The developer 22 used was an Oakes Mixer, Model 8M, made by E. T. Oakes Company of Islip, N.Y. The pump 14 was operated at a sufficient speed so that the flow rate through the pipe 16 into the mixer 22 was about 550 gms. of dough per 15 seconds, and the valve 18b was operated so that in 15 seconds about 1700 cubic centimeters of carbon dioxide at atmospheric pressure and about 70° F. was injected into the pipe 16 each 9 seconds, with the speed of the Oakes mixer being between 140 to 180 revolutions per minute. (In determining this flow of carbon dioxide, a flow meter made by Fisher and Porter Company of Warminster, Pennsylvania, and having a Fisher and Porter Precision Bore Flowrator Tube No. 1–A–10–A/70, was used, and a correction factor was applied to the reading of this flow meter in accordance with the instruction bulletin 10A 9020, Revision I, from this same Fisher and Porter Company. Thus it is recognized that since this was not a "direct" measurement, this 1700 ccs. of carbon dioxide is a value subject to the possibility of error inherent in this method of measurement.)

The valve 30 was initially positioned so that the dough from the developer 22 would travel through the pipe 28 into the settling chamber. The approximate time it took for the dough to travel from the pump 14 through the pipe 16, through the developer 22, and to the valve 30 was about sixty-five seconds. After the developer 22 had become filled with dough, the pressure of the dough in the developer was at about 180 p.s.i., gauge. Also, as the dough was moved by the pump 14 through the system, gas was bled out of the settling chamber through the valve 66, so that the pressure in the settling chamber was maintained at about 100 p.s.i. gauge. After about 200 or 300 gms. of dough had moved into the settling chamber, the valve 30 was turned to its second position so that dough was diverted upwardly through the pipe 31 and into the pan 32 through the hole 40 in the pan 32.

After about 550 gms. of dough had been discharged into the pan 32 in the panning chamber 44, the valve 30 was moved back to its first position so that the dough from the developer 22 flowed into the settling chamber. Then the valve 62 was opened to a position such that the carbon dioxide in the panning chamber 44 escaped therefrom at a rate such that at the end of about 30 seconds, the pressure in the chamber 44 had dropped to atmospheric. The pan 32 with the dough loaf therein, which had risen to the desired extent, was then taken from the chamber 44 and placed in a conventional baking oven to be baked into a finished bread loaf.

After the first dough loaf was taken from the panning chamber 44, a second pan 32 was placed in the chamber 44; the door 50 was closed; and the chamber 44 was again pressurized with carbon dioxide to about 100 p.s.i. guage. Then the valve 30 was moved to its second position until about 550 gms. of dough had been discharged into the second pan 32, after which the valve 30 was moved back to its first position to divert dough from the developer 22 into the settling chamber. Pressure was released from the chamber 44 (in the same manner as described above) to raise the dough loaf, which was then removed and baked in a conventional oven. In this same manner eight other loaves were made, this making a total of ten loaves made in this run. Additional batches of dough were made in the manner described above and added to the hopper 10 as needed so that throughout the run there was always dough in the hopper 10 to be fed to the pump 14.

The ten loaves each had a conventional loaf configuration with a smooth round top surface. Each loaf had a uniform grain structure throughout, which was somewhat fine (but not excessively fine) and yet sufficiently firm for good loaf quality. The bread had good texture and mouth feel. Bread slices cut from each loaf made excellent toast and buttered well, both toasted and untoasted. The volume ratio of the bread loaves (i.e., the ratio of the volume of the baked bread to the weight of the dough loaf *before baking*) varied between 4.91 to 5.75 ccs./gm., with the average ratio being 5.18 ccs./gm. In general, it can be said that the bread had high volume and good overall quality.

*Example II*

The same process was followed as in Example I, except that instead of having a hopper 10 and feed auger 12 (as shown in FIG. 1) there was provided a loading cylinder and a piston. The loading cylinder was filled with a batch of dough made as in Example I; the piston was placed in the cylinder; and hydraulic pressure of about one hundred p.s.i. gauge was exerted on the piston to feed the dough to the pump 14. The pump 14 and developer 22 were operated in a manner that the rate of flow of dough through the pipe 16 and through the developer 22 was about 550 gms. of dough per nine seconds, and the valve 18b was operated in a manner that about 1700 ccs. of carbon dioxide flowed into the pipe 16 per nine second period. The Oakes mixer was operated at about 220 revolutions per minute. It took about forty seconds for the dough to travel from the pump 14 to the valve 30. After about 200 to 300 gms. of dough had moved through the valve 30 and into the settling chamber, the valve 30 was moved to its second position until about 550 gms. of dough had moved into the pan 32 in the chamber 44. The valve 30 was then moved back to its first position, and the pump 14 and developer 22 were stopped while pressure was released from the chamber 44 to raise the dough loaf (as in Example I). Then the pan 32 was removed from the chamber 44, a second pan 32 was placed in the chamber 44, and the chamber 44 was again pressurized. After this, the pump 14 and the developer 22 were again started up and about 1500 to 2000 gms. of dough was diverted into the settling chamber before the valve 30 was turned to its second position to discharge a second 550 gm. charge of dough into the second pan 32 in the chamber 44 to make a second dough loaf. Pressure was then lowered in the chamber 44 (as described above), and the second pan of dough was removed. A third loaf was made in the same manner as described above. All three dough loaves were baked in a conventional baking oven.

The three loaves of bread so made were comparable in quality to those made according to Example I. The volume to weight of dough ratios (again the dough being weighed before baking) were for the three loaves: 5.14, 5.65 and 5.40 ccs./gm.

*Example III*

The same process was followed as in Example II, except that in making the dough, 200 ccs. of additional water was added to the dough, instead of 150 ccs. of water, to bring the water absorption level to 64% instead of the 63% used in Examples I and II.

The three loaves of bread were of good overall quality and had slightly higher volume to weight of dough (i.e., weight before baking) ratios, which were as follows: 5.62, 5.81 and 5.61.

It should be understood that the foregoing is merely illustrative of a certain embodiment of the invention and many variations may be made by those skilled in the art without departing from the spirit and scope of the invention.

Now therefore I claim:
1. A process for making bread, comprising injecting a non-toxic gas under superatmospheric pressure into a bread dough also under superatmospheric pressure and mechanically developing said dough with said gas in a developing area to produce a developed dough, moving said dough still under superatmospheric pressure from said developing area into a pressurized chamber in a bread configuration, then reducing the pressure in said chamber at a rate sufficiently slow to cause said bread dough to raise without disrupting the cell structure thereof, and then baking said dough.

2. A process for making bread, comprising injecting a non-toxic gas under superatmospheric pressure into a bread dough also under superatmospheric pressure and mechanically developing said dough with said gas in a developing area to produce a developed dough, moving said dough still under superatmospheric pressure from said developing area into a pressurized chamber in an upward direction and into a bread configuration, then reducing the pressure in said chamber at a rate sufficiently slow to cause said bread dough to raise without disrupting the cell structure thereof, and then baking said dough.

3. The process as recited in claim 2, wherein said dough in being moved from said developing area to said pressurized chamber is constricted at a constriction area so as to cause a pressure drop in said dough as it travels through said constriction area.

4. A process for making bread, comprising injecting a non-toxic gas under superatmospheric pressure into a bread dough also under superatmospheric pressure and mechanically developing said dough with said gas in a developing area to produce a developed dough, moving said dough still under superatmospheric pressure from said developing area through a constriction area and into a pressurized chamber in a bread configuration, said dough experiencing a drop in pressure as it moves through said constriction area, then reducing the pressure in said chamber at a rate sufficiently slow to cause said bread dough to raise without disrupting the cell structure thereof, and then baking said dough.

5. A process for making bread, comprising injecting a non-toxic gas under superatmospheric pressure into a bread dough also under superatmospheric pressure and mechanically developing said dough with said gas in a developing area to produce a developed dough, moving said dough still under superatmospheric pressure from said developing area along a passageway into a pressurized chamber in a bread configuration, said passageway having a constricted portion that is centered with respect to said passageway whereby the dough is accelerated and centered in said passageway as it passes through said constricted portion, then reducing the pressure in said chamber at a rate sufficiently slow to cause said bread dough to raise without disrupting the cell structure thereof, and then baking said dough.

References Cited
UNITED STATES PATENTS

| | | | |
|---|---|---|---|
| 2,882,839 | 4/1959 | Kruder | 107—54 |
| 3,245,361 | 4/1966 | Enoch et al. | 107—54 |

WILLIAM I. PRICE, *Primary Examiner.*

J. SHEA, *Assistant Examiner.*